J. P. CHAMPION.
VEHICLE WHEEL.
APPLICATION FILED AUG. 21, 1912.
1,078,256.
Patented Nov. 11, 1913.
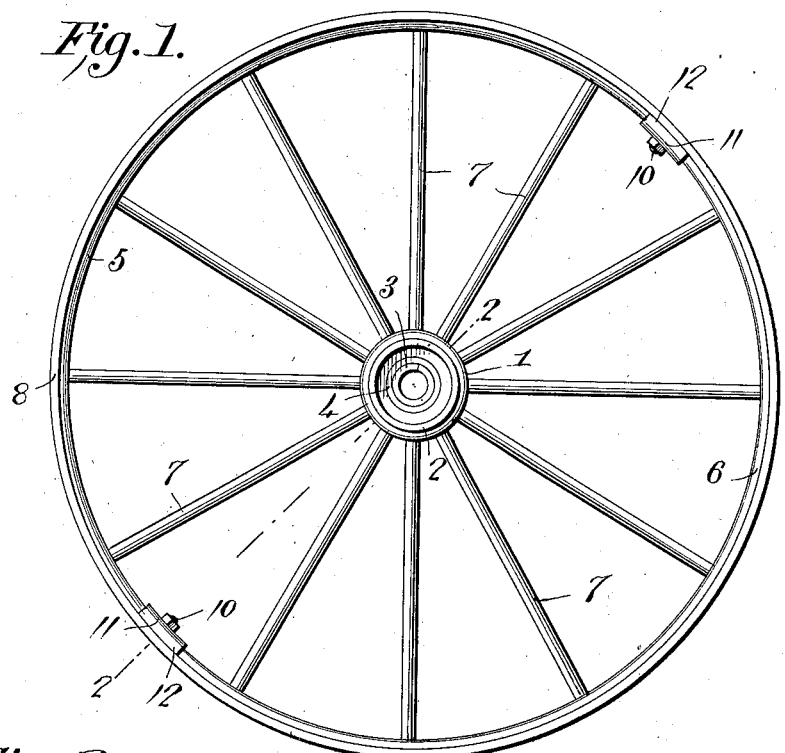
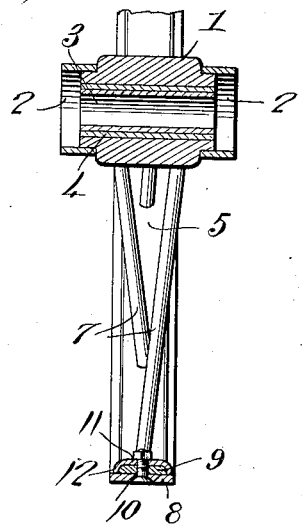
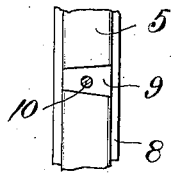
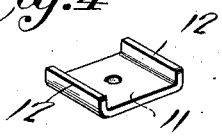
Inventor
James P. Champion,
By Victor J. Evans
Attorney
Witnesses
Carroll Bailey

UNITED STATES PATENT OFFICE.

JAMES P. CHAMPION, OF CHIPLEY, GEORGIA, ASSIGNOR OF ONE-THIRD TO JESSIE H. CHAMPION AND ONE-THIRD TO JAMES E. CHAMPION, BOTH OF CHIPLEY, GEORGIA.

VEHICLE-WHEEL.

1,078,256. Specification of Letters Patent. Patented Nov. 11, 1913.

Application filed August 21, 1912. Serial No. 716,260.

*To all whom it may concern:*

Be it known that I, JAMES P. CHAMPION, a citizen of the United States, residing at Chipley, in the county of Harris and State of Georgia, have invented new and useful Improvements in Vehicle-Wheels, of which the following is a specification.

This invention relates to vehicle wheels and one of the objects of the invention is to provide a simple and efficient means for expanding the felly so that the felly and tire are always in tight engagement with one another and thereby prevented from rattling.

Another object of the invention is the provision of novel means for securing the boxing within the hub so that it may be readily removed when worn or otherwise damaged.

Further objects of this invention will appear as the following specific description is read in connection with the accompanying drawing, which forms a part of this application, and in which:—

Figure 1 is a side elevation. Fig. 2 is a transverse sectional view on the line 2—2 of Fig. 1. Fig. 3 is a fragmental elevation with the wedge retaining clip removed, showing the position of the wedge between the ends of the felly. Fig. 4 is a perspective view of the clip. Fig. 5 is a similar view of the wedge.

In the specific embodiment of the invention as illustrated herein, 1 represents an iron hub having reduced extensions thereon upon which are shrunk the sand bands 2. Passing centrally through the hub and spaced therefrom is an ordinary axle boxing 3 which is held in position by a Babbitt metal filling 4 which is poured in between the boxing and the hub and holds the boxing firmly in position. It may also be seen that this boxing may be readily removed by melting the Babbitt metal filling when it is desired to replace the worn or otherwise damaged boxing.

The felly is here shown as constructed of two parts 5 and 6 which are connected to the hub 1 by the spokes 7, the latter being preferably removably connected to both the hub and the felly so that in case of damage, they may be readily removed and replaced and surrounding the felly is the ordinary wheel tire 8. In order to keep the felly in tight engagement with the tire in case of shrinkage of the felly or expansion of the tire, I insert transverse wedges 9 between the ends of the separate sections 5 and 6, through which is passed a bolt 10 also serving to hold upon the felly a clip 11 having out-turned ends 12 which overhang the side of the felly. This clip and bolt serve not only to prevent lateral movement of the ends of the felly but also to hold the tire to the felly and to prevent disengagement of the wedge from between the ends thereof. The out-turned ends of the clip also assist the bolt 10 in preventing transverse movement of the wedge, as will be readily understood. If the tire should become loose on the felly either by contraction of the felly or expansion of the tire while the wedge is in position therein, the wedge may be removed and liners placed on either side of the same and the wedge again driven home.

What is claimed is:—

A wheel comprising a hub, a felly connected thereto consisting of a plurality of sections, a tire surrounding said felly and extending beyond the opposite sides thereof, a flat wedge horizontally arranged between the ends of said sections for expanding the felly and having a central opening therein, a clip arranged over and entirely inclosing said wedge and having out-turned ends embracing the opposite sides of the felly to prevent lateral displacement of the wedge and felly sections, said clip engaging the inner surface of the tire and being arranged wholly between the marginal edges of the same, and a bolt passing through said tire, wedge, and clip.

In testimony whereof I affix my signature in presence of two witnesses.

JAMES P. CHAMPION.

Witnesses:
H. G. FINLAY,
HENRY ZACKEY.

Copies of this patent may be obtained for five cents each, by addressing the "Commissioner of Patents, Washington, D. C."